United States Patent
Maher et al.

(10) Patent No.: US 6,623,103 B2
(45) Date of Patent: Sep. 23, 2003

(54) LASER ABLATION METHOD FOR UNIFORM NOZZLE STRUCTURE

(75) Inventors: Colin Geoffrey Maher, Georgetown, KY (US); James Michael Mrvos, Lexington, KY (US); James Harold Powers, Lexington, KY (US); Kent Lee Ubellacker, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 226 days.

(21) Appl. No.: 09/829,526

(22) Filed: Apr. 10, 2001

(65) Prior Publication Data

US 2002/0149645 A1 Oct. 17, 2002

(51) Int. Cl.[7] .............................. B41J 2/16; B41J 2/14
(52) U.S. Cl. ................... 347/47; 219/121.71; 264/400; 29/890.1
(58) Field of Search ........................ 219/121.7, 121.71, 219/121.85, 121.6; 264/400; 347/44, 47; 29/890.1

(56) References Cited

U.S. PATENT DOCUMENTS

| 4,767,909 A | 8/1988 | Okumoto |
| 5,037,183 A | 8/1991 | Gagosz et al. |
| 5,043,553 A | 8/1991 | Corfe et al. |
| 5,063,280 A | 11/1991 | Inagawa et al. |
| 5,160,823 A | 11/1992 | Bennin et al. |
| 5,237,148 A | 8/1993 | Aoki et al. |
| 5,263,250 A | 11/1993 | Nishiwaki et al. |
| 5,296,673 A | 3/1994 | Smith |
| 5,298,716 A | 3/1994 | Ogawa et al. |
| 5,430,816 A | 7/1995 | Furuya et al. |
| 5,585,019 A | 12/1996 | Gu et al. |
| 5,657,539 A | 8/1997 | Orikasa et al. |
| 5,841,101 A | 11/1998 | Nishiwaki |
| 6,008,468 A | 12/1999 | Tanaka et al. |
| 6,075,222 A | 6/2000 | Hasegawa |

FOREIGN PATENT DOCUMENTS

| JP | 63154285 | 6/1988 |
| JP | 5305472 | 11/1993 |
| JP | 7304179 | 11/1995 |
| WO | WO 00/30799 | 6/2000 |

*Primary Examiner*—Huan Tran
(74) *Attorney, Agent, or Firm*—Luedeka, Neely & Graham, P.C.

(57) ABSTRACT

The invention provides a method for forming ink jet nozzle structures in an ablatable material. More particularly, the invention provides uniform nozzle structure by ablating an ablatable material with a laser beam while setting a field lens unit to various locations relative to a projection lens. The resulting ink jet nozzle structures have substantially orthogonal ink delivery trajectory paths relative to a plane defined by the length and width of the ablatable material regardless of the nozzles hole position relative to the edges of the ablatable material.

19 Claims, 4 Drawing Sheets

LASER ABLATION METHOD FOR UNIFORM NOZZLE STRUCTURE

TECHNICAL FIELD

The invention relates generally to ink jet printers. More particularly, the invention relates to a method for laser ablating an ablatable material to form a uniform nozzle structure having substantially parallel ink delivery paths.

BACKGROUND

Precise placement of ink drops onto a print medium is dependent upon uniformity of the nozzle structure among a plurality of nozzles formed in a film from which nozzle plates are formed. Current laser ablation techniques tend to form nozzles which are not parallel to one another. That is, the ink drops expelled from the nozzles do not follow parallel trajectories from nozzle to nozzle. Converging or diverging ink droplets result in less than optimal print quality.

What is needed, therefore, is a laser ablation system and method operable to form uniform nozzle structure in an ablatable material so that ink drops expelled from each nozzle follows a substantially parallel trajectory from nozzle to nozzle.

SUMMARY OF THE INVENTION

The foregoing and other needs are provided by a laser ablation system and method for forming ink delivery structure in an ablatable material. According to the invention, a method for fabricating an ink delivery structure in an ablatable material utilizes a laser ablation system including a laser for transmitting a laser beam. The laser ablation system also includes a field lens unit coupled to a field lens unit actuator, a projection lens, a mask disposed between the field lens unit and the projection lens, the mask having a first formation portion and a second formation portion, and a mask adjustment device for positioning the first or the second formation portion of the mask relative to the field lens unit. The field lens unit is set to a first position relative to the projection lens with the field lens unit actuator and the first formation portion of the mask is positioned relative to the first position of the field lens unit. The ablatable material is then partially ablated with the laser beam through the first formation portion of the mask. The field lens unit is then set to a second position relative to the projection lens, and the second formation portion of the mask is positioned relative to the second position of the field lens unit. The ablatable material is then ablated with the laser beam through the second formation portion of the mask. A substantially diverging laser beam structure is transmitted through the projection lens due to the second position of the field lens unit, resulting in a substantially uniform nozzle structure.

According to the invention, a uniform nozzle structure is formed in the ablatable material by repositioning a field lens unit during various ablation steps, optimizing the ejection of ink and corresponding drop placement on the print medium. Furthermore, the lifetime of the projection lens is not compromised due to the repositioning of the field lens unit and associated focal point. That is, when the field lens unit and associated focal point is moved closer to the projection lens, a portion of the mask is utilized which masks enough of the laser energy to substantially compensate for the shorter distance between the focused beam and the projection lens, thereby reducing the laser energy impacting on the projection lens.

BRIEF DESCRIPTION OF THE DRAWINGS

Further advantages of the invention will become apparent by reference to the detailed description when considered in conjunction with the figures, wherein like reference numbers indicate like elements through the several views, and wherein.

DETAILED DESCRIPTION OF THE INVENTION

Figure 1:
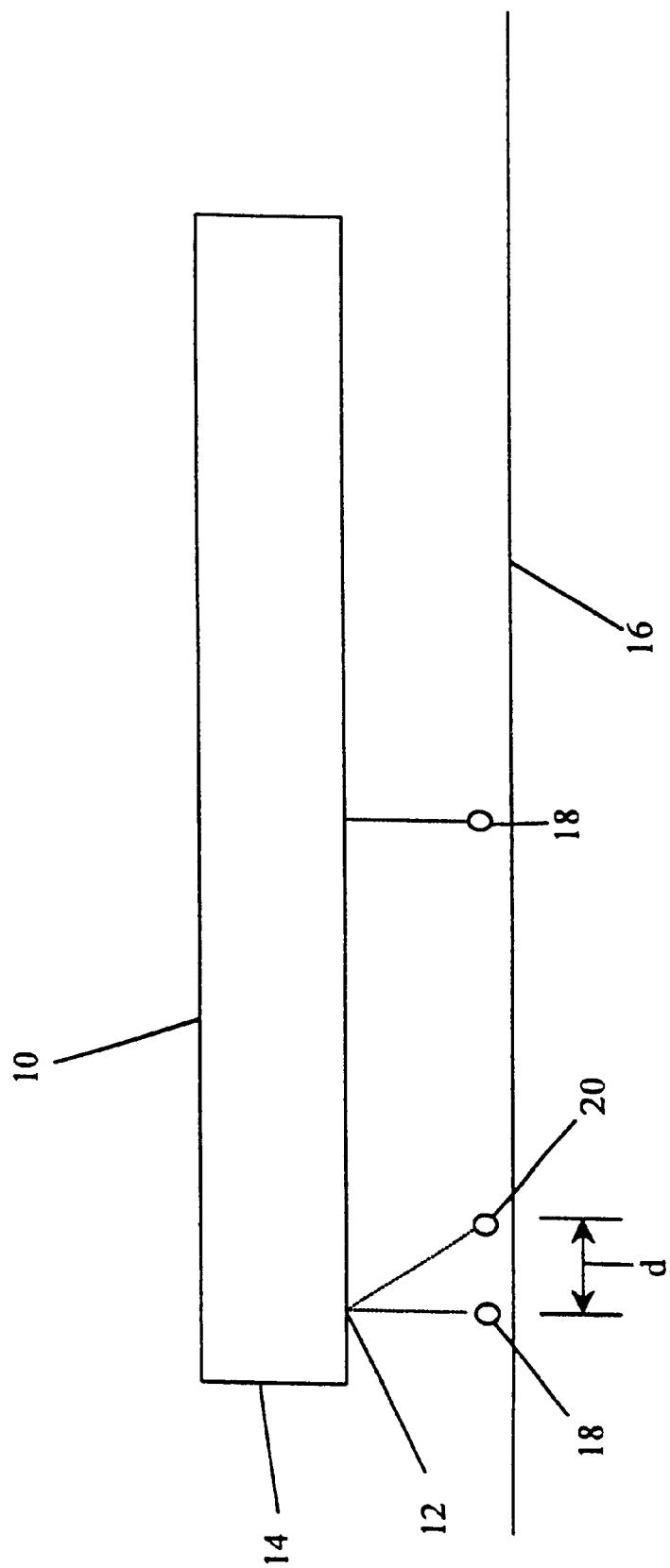
FIG. 1 is an illustration of nozzle misalignment within an ink delivery structure provided by a conventional nozzle formation technique.

Referring now to the Figures in which like reference numerals indicate like or corresponding features, there is shown in FIG. 1, not drawn to scale, a side view of an ablatable material or film 10, composed of polymeric material, preferably polyimide, illustrating the problem associated with a conventional laser ablation technique. The foregoing disclosure assumes that the ablatable material 10 is substantially centered relative to the laser ablation optics during the ablating procedure.

As shown in FIG. 1, some of the nozzle holes 12 are formed having slanted inward or "toed-in" orientation along the length of the ablatable material 10. This "toeing" phenomenon becomes more pronounced for the nozzle structure located nearer the edges 14 of the ablatable material 10. It has been observed that the "toeing" phenomenon is a linear function increasing from nearly zero at the center of the ablatable material 10 to a number, 'x', adjacent the edges 14 of the ablatable material 10. As a result of this "toeing" phenomenon, the ink ejected onto the print medium 16 from the imperfect nozzle structure is not optimal. The distance, 'd', represents the difference between an optimal drop placement location 18 and a sub-optimal drop placement location 20 as a result of the "toeing" phenomenon. The distance, 'd', for the optimal drop location 18 may range from about zero to about 10 $\mu$m adjacent the edges 14 of the ablatable material. As described above, for the imperfect nozzle structure, the distance, 'd', decreases, moving from the outer edges 14 towards the center of the ablatable material 10.

Figure 2:
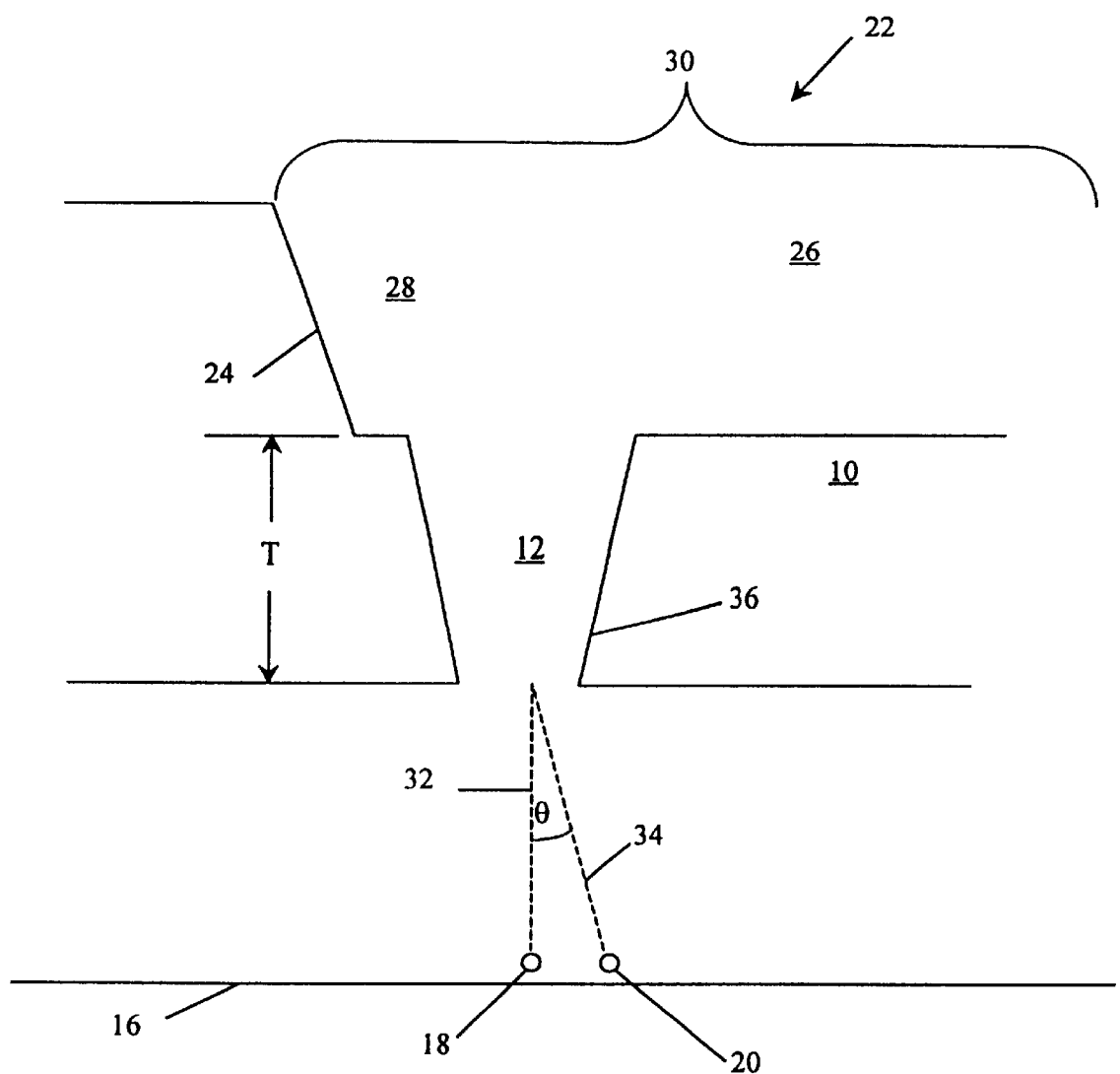
FIG. 2 is an enlarged cross-sectional view of a portion of an ink delivery structure made by a conventional process.

With additional reference now to FIG. 2, an enlarged cross-sectional view representative of the problem of the ink delivery structure 22 is shown. The ink supply portion 24 of the ink delivery structure 22 includes a throat 26 and a chamber 28 in an ablated region 30. The line 32 is representative of an optimal drop trajectory line for a preferred nozzle hole 12 structure after the laser ablation method according to the invention is utilized, as described further below. Preferably, the line 32 is substantially orthogonal with respect to a plane defined by a length and a width of the ablatable material 10.

The line 34 represents sub-optimal nozzle structure trajectory and the corresponding sub-optimal drop trajectory line 34 which the present invention is directed to overcome. As shown, the lines 32 and 34 are offset by an angle, $\theta$, which is the angular offset between an optimal and a sub-optimal ink trajectory path. For optimal ink trajectory path (line 32), the angle, θ, ranges from about zero to about 0.3 degrees. It should be noted that FIG. 2 is a cross-sectional view of a nozzle 12, and degrees. It should be noted that FIG. 2 is a cross-sectional view of a nozzle 12, and accordingly, one or more than one of trajectory line(s) 34 may be present after a conventional laser ablation process is complete. Correspondingly, this sub-optimal nozzle structure produces erroneous drop placement due to a sub-optimal ink drop trajectory path 34, as described above.

The lower portion of the ablatable material 10 includes the nozzle structure defined by side walls 36. Preferably, the nozzle hole 12 is formed in the ablatable material 10 with a uniform frustoconical shape, and most preferably, all of the nozzle holes 12 are formed having uniform shape and the resulting optimal ink delivery trajectory path 32, according to the laser ablation techniques described herein. For ease of explanation, the preferred nozzle structure is described with respect to a single nozzle hole 12, however the laser ablation method is applicable to the formation of one or a plurality of nozzle holes 12 in the ablatable material 10.

Figure 3:
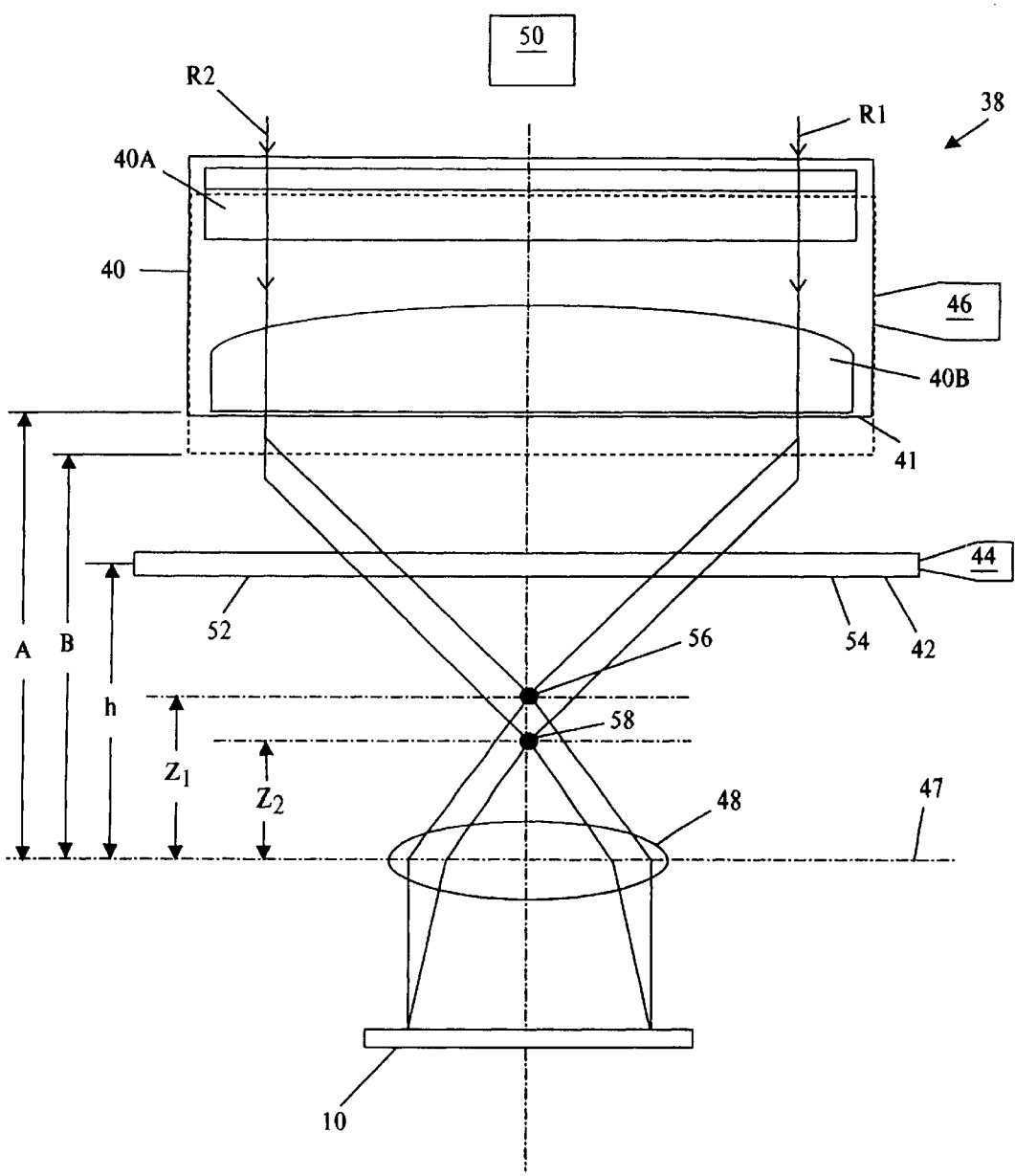
FIG. 3 is a depiction of laser ablation system according to an embodiment of the invention.

The laser ablation method for forming optimal nozzle holes 12 according to the invention is described initially with reference to FIG. 3. Accordingly, the laser ablation method utilizes a laser ablation system 38 to form the ink delivery structure 22 in the ablatable material 10. Various laser ablation systems are available and the invention described herein is not intended to be limited to any specific laser ablation system. The laser ablation system 38 includes a field lens unit 40, mask 42, mask adjustment device 44, field lens unit actuator 46, projection lens 48, and laser 50. The laser 50 is preferably an excimer laser, having a transmission wavelength of about 248 nanometers.

The field lens unit 40 is operable to collect the laser beam transmitted by the laser 50 and focus the beam at a location preferably between the mask 42 and the projection lens 48. More specifically, when the laser 50 is transmitting a laser beam, the field lens unit 40 collects the laser light and directs the collected light to a location described in greater detail below. According to the invention, by relocating the position of the field lens unit 40 with respect to the laser 50, the corresponding focal point 56 is re-located to a focal point 58 between the field lens unit 40 and the projection lens 48. The field lens unit 40 can contain one or more lenses and connecting parts therein. It is preferred that the lenses of the field lens unit 40 include cylindrical plano-convex type lenses. The field lens unit 40 is movable through a multitude of locations between the laser 50 and the mask 42, adjustable by the field lens unit actuator 46.

As described above, the field lens unit actuator 46 maintains the field lens unit 40 at various positions in relation to the mask 42, projection lens 48 and ablatable material 10. The projection lens 48 is preferably a telecentric type lens having approximately a five-times (5×) magnification ratio. Preferably, the mask 42 includes a first formation portion 52 and a second formation portion 54 for forming different flow features in the ablatable material 10. However, the mask 42 is not limited to two formation portions, and may include one or more than one formation portions. Each formation portion of the mask 42 includes a different template for creating particular features in the ablatable material 10 during laser ablation. Preferably, the second formation portion 54 of the mask 42 includes masking features allowing an amount of energy density from the laser beam insufficient to cause substantial damage to the projection lens 48 as the field lens unit 50 is moved closer to the projection lens 48.

According to the invention, the laser ablation method utilizes the field lens unit actuator 46 to move the field lens unit 40. For convenience purposes, field lens 40 movement distances and/or focal points are defined with respect to the mask 42 or projection lens 48. The location of the field lens unit 40 and resulting focused laser beam is dependent upon the particular structure being formed in the ablatable material 10. The field lens unit actuator 46 is preferably an electric motor driven device operable to change the distance between the field lens unit 40 and the mask 42 or projection lens 48. Alternatively, the field lens unit actuator 46 may be driven by pneumatics or a solenoid.

According to one embodiment of the invention, as best shown in FIG. 3, the field lens unit 40 contains a first lens 40A and a second lens 40B, mounted therein. For reference purposes, distances between the field lens unit 40 and the projection lens 48, mask 42, and laser 50 are determined from the bottom edge 41 of the field lens unit 40. Likewise, distances between the projection lens 48 and the mask 42 and the field lens unit 40 are determined from the reference line 47, corresponding substantially with the major axis of the projection lens 48.

Figure 4:
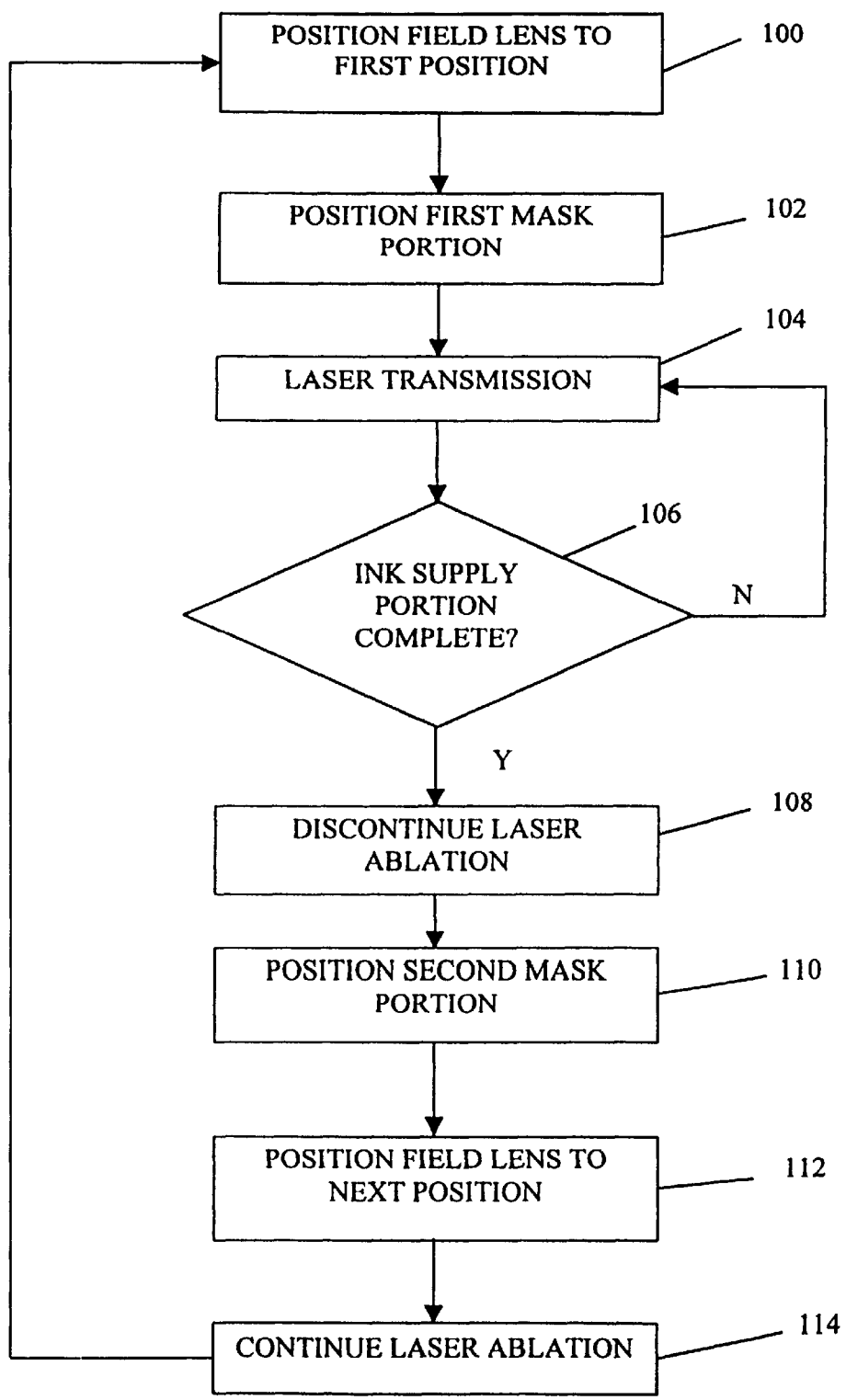
FIG. 4 is a flowchart depicting a method of forming nozzle structure, according to an embodiment of the invention.

With additional reference to FIG. 4, at step 100, the field lens unit 40 is set to a first position, A, relative to the projection lens 48 in preparation of forming the ink delivery structure 22 in the ablatable material 10. The mask 42 is preferably located a fixed distance, h, relative to the projection lens 48 (FIG. 3). The first formation portion 52 of the mask 42 is moved into position below the field lens unit 40 in preparation for the first ablation step (step 102). At step 104, the laser is powered on and the laser beam is directed at the field lens unit 40. The field lens unit 40 collects and focuses the laser beam provided by the laser 50. Accordingly, exemplary marginal rays, designated R1 and R2, generated by the laser beam converge through the field lens unit 40 to a first focal point 56, located at a position $Z_1$ relative to the position of the projection lens 48 (FIG. 3).

As best shown in FIG. 3, the laser beam transmitted by field lens unit 40 diverges after the first focal point 56, thereafter impinging upon the telecentric projection lens 48. With the field lens unit 40 located at the first position, A, relative to the projection lens 48 (distance (A–h) from the mask 42), the laser beam transmitted through the projection lens 48 has a substantially orthogonal trajectory with respect to a plane defined by a length and a width of the ablatable material 10. Stated another way, the laser beam transmitted through the projection lens 48 has a substantially parallel orientation with respect to the optimal ink delivery trajectory path 32 (FIG. 2). This substantially parallel orientation as a result of the field lens unit 40 located at position A, is preferred for the formation of the ink supply portion 24 of the ink delivery structure 22. The laser 50 continues to emit ablation energy until the formation of the ink supply portion 24, including the throat 26 and chamber 28 in the ablated region 30 of the ink delivery structure 22 is substantially complete (step 106), according to design specifications. In accordance with the invention, the position of the field lens unit 40 during the formation of the ink supply portion 24 is optimized for feature quality.

Once the ink supply portion 24 of the ink delivery structure 22 is complete, the laser ablation step is temporarily discontinued (step 108). Preferably, the laser 50 is powered off at step 108, thereby preventing further ablation of the ablatable material 10. Alternatively, laser ablation is discontinued by closing a laser beam shutter in the laser beam transmission path from the laser 50 to the field lens unit 40.

At step 110, the second formation portion 54 of the mask 42 is moved by the mask adjustment device 44 into position below the field lens unit 40 in preparation for the next ablation step. Preferably, the field lens unit 40 is moved to a second position, B, relative to the location of the projection lens 48 (distance (B–h) relative to the mask 42) while the mask 42 is re-positioned so that the second formation portion 54 of the mask 42 is irradiated by the laser beam of the laser 50. By moving the mask 42 and field lens unit 40 substantially simultaneously, there is no adverse effect on the cycle time of the laser ablation system 38.

The field lens unit actuator 46 is operable to relocate one or more lenses of the field lens unit 40 to various positions during each ablation step for the formation of a preferred ink delivery structure 22. The compensation required to form a preferred nozzle structure having nozzles with ink ejection trajectory orthogonal to the plane of the ablatable material is provided by the amount of relative displacement between the field lens unit 40 and the projection lens 48. Accordingly, as the relative distance between the field lens unit 40 and projection lens 48 is precisely controlled by the operation of the field lens unit actuator 46, the amount of compensation required to form the preferred nozzle structure is changed. Preferably, a microprocessor controls the positioning of the field lens unit 40 by controlling the field lens unit actuator 46 based on the preferred compensation required for structural formation of the ablatable material 10.

With continuing reference to FIG. 3, according to a preferred embodiment of the invention, once the field lens unit 40 is moved into position B (step 112), a new focal point 58 is defined. The distance between the new focal point 58 and the projection lens is identified as $Z_2$. As described above, when the field lens unit 40 is located at position A, and the focal point 56 is located a distance, $Z_1$ from the projection lens 48, the laser beam transmitted through the projection lens 48 is in a substantially parallel relation to an optimal ink delivery trajectory path 32 when ablating the ablatable material 10. It will be recognized that as the field lens unit 40 is moved further from the projection lens 48 from position A towards the laser 50, a new focal point is defined. Correspondingly, the laser beam transmitted through the projection lens 48 is in a substantially converging configuration. The amount of convergence increases from substantially no convergence at the center of the beam to a greatest amount of convergence, 'x', adjacent the outer periphery of the beam. The amount of convergence being dependent on the distance between the new focal point and the location of the projection lens 48.

Analogously, as the field lens unit 40 is moved closer to the projection lens 48 from position A to position B, a new focal point 58 is defined and the laser beam transmitted through the projection lens 48 is in a substantially diverging configuration. The amount of divergence increases from substantially no divergence at the center of the beam to a greatest amount of divergence, 'y', adjacent the outer periphery of the beam. The amount of divergence being dependent on the distance, $Z_2$, between the focal point 58 and the location of the projection lens 48. This divergent laser beam exiting the projection lens 48 is preferred for the formation of the nozzles holes 12. Accordingly, straight nozzle holes 12 having a substantially uniform structure are formed through the remaining thickness of the ablatable material 10 (step 114).

The uniform nozzle structure formed according to the invention substantially provides the corresponding preferred optimal ink delivery trajectory path 32. This uniform nozzle hole structure is provided by ablating the ablatable material 10 with the divergent laser beam structure exiting the projection lens 48. Once the ink delivery structure 22 is complete, the field lens unit 40 is moved back to position A, the first formation portion of the mask 42 is positioned below the field lens unit 40, and unablated ablatable material 10 is positioned below the projection lens 48 in preparation for the next ink delivery structural formation process. It should be noted that normally moving the field lens unit 40 and the corresponding focal point closer to the projection lens 48 reduces the life of the projection lens 48. However, according to the invention, a substantial amount of the beam energy is masked by the second formation portion 54 of the mask 42, substantially compensating for the closer location of the field lens unit 40 to the projection lens 48

Referring again to FIGS. 2 and 3, an example of the improvement in the uniformity of the nozzle structure and corresponding drop placement according to the invention is described. For the example, an ablatable material area of approximately 11.5 mm long×1 mm wide was ablated according to the ablation process described above. Laser ablation of a polyimide nozzle plate material was conducted generally in accordance with laser equipment and laser operating procedures described in U.S. Pat. No. 6,120,131 to Murthy et al incorporated herein by reference as if fully set forth. Accordingly, 192 nozzle holes 12 were formed, each having an exit diameter of approximately 16 µm. During the formation process, the field lens unit 40 was moved about 30 mm from location A to location B. Accordingly, for a 30 mm re-positioning of the field lens unit 40, the resulting θ, which is the angular offset between an optimal and a sub-optimal ink trajectory path, was about 0.1 degree with a corresponding droplet displacement from the optimal drop placement location 18 of about 2 µm. Comparatively, a one degree θ value and 20 µm droplet displacement from the optimal drop placement location 18 was seen for nozzles formed without relocating the field lens unit 40 according to the invention.

Having described various aspects and embodiments of the invention, and several advantages thereof, it will be recognized by those of ordinary skills that the invention is susceptible to various modifications, substitutions and revisions within the spirit and scope of the appended claims. For example, the methods described herein are not limited to two ablation steps, but one or more ablation steps and field lens positional adjustment may be necessary dependent upon the particular ablatable material ablation application and preferred resulting ablatable material structure. Moreover, the invention is not limited to forming the ink supply structure before the nozzle structure. Accordingly, and in accordance with the invention, the nozzles can be formed before the formation of the ink delivery structure.

What is claimed is:

1. A method for fabricating an ink delivery structure in an ablatable material using a laser beam, the method comprising the steps of:

providing a laser ablation system having a field lens unit coupled to a field lens unit actuator, a projection lens, a mask disposed between the field lens unit and the projection lens, the mask having a first portion and a second portion, and a mask adjustment device for positioning the first or the second portion of the mask relative to the field lens unit, setting the field lens unit with the field lens unit actuator to a first position relative to the projection lens, positioning the first portion of the mask relative to the first position of the field lens unit, partially ablating the ablatable material with the laser beam through the first portion of the mask, setting the field lens unit to a second position relative to the projection lens, positioning the second portion of the mask relative to the second position of the field lens unit, and ablating the ablatable material with the laser beam through the second portion of the mask.

2. The method of claim 1 wherein the step of setting the field lens unit to a first position further comprises powering off the laser to prevent ablation of the ablatable material while setting the field lens unit to the first position.

3. The method of claim 1 wherein the step of setting the field lens unit to a second position relative to the projection lens further comprises powering off the laser to prevent ablation of the ablatable material while setting the field lens unit to the second position.

4. The method of claim 1 wherein the step of partially ablating the ablatable material with the laser beam through the first portion of the mask further comprises forming an ink supply portion of the ink delivery structure.

5. The method of claim 1 wherein the step of ablating the ablatable material with the laser beam through the second portion of the mask further comprises forming nozzle holes having a substantially orthogonal ink delivery trajectory path through the ablatable material relative to a plane defined by a length and a width of the ablatable material.

6. The method of claim 1 wherein the step of setting the field lens unit with the field lens unit actuator to a first position relative to the projection lens further comprises locating a lens focal point at a distance $Z_1$ relative to the projection lens.

7. The method of claim 1 wherein the step of setting the field lens unit to a second position relative to the projection lens further comprises locating a lens focal point at a distance $Z_2$ relative to the projection lens.

8. The method of claim 6 further comprising the step of ablating the ablatable material with a substantially parallel laser beam transmitted by the projection lens due to the first position of the field lens unit relative to the projection lens, thereby forming an ink supply portion of the ink delivery structure.

9. The method of claim 7 further comprising the step of ablating the ablatable material with a substantially diverging laser beam, transmitted by the projection lens due to the second position of the field lens unit relative to the projection lens, wherein the divergence is greatest at the outer periphery of the beam and the divergence decreases to substantially zero at the center of the beam thereby forming nozzles having a substantially orthogonal ink delivery path through the ablatable material relative to a plane defined by a length and a width of the ablatable material.

10. The method of claim 1 further comprising the steps of locating a first focal point at a distance $Z_1$ relative to the projection lens due to the first position of the field lens unit, and locating a second focal point at a distance $Z_2$ relative to the projection lens due to the second position of the field lens unit, wherein the distance $Z_1$ is greater than the distance $Z_2$.

11. The method of claim 1 wherein the steps of setting the field lens unit to a second position relative to the projection lens and positioning the second portion of the mask relative to the second position of the field lens unit are performed in a substantially simultaneous manner.

12. The method of claim 1 further comprising the step of ablating the ablatable material so as to reduce an angular offset, θ, between a sub-optimal ink drop trajectory and an optimal ink drop trajectory.

13. Ink jet nozzle holes formed in an ablatable material by a laser ablation process, the ablatable material having a length and a width defining a surface plane, and the laser ablation process including a laser for transmitting a laser beam, a movable field lens unit movable through a plurality of locations relative to a projection lens and a mask disposed between the field lens unit and the projection lens, the mask having a first formation portion and a second formation portion, wherein the nozzle holes have sidewalls and are formed through a thickness of the ablatable material along the length of the ablatable material by the steps of:

setting the field lens unit to a first position relative to the projection lens, partially ablating the ablatable material with the laser beam through the first formation portion of the mask, setting the field lens unit to a second position relative to the projection lens, and ablating the ablatable material with the laser beam through the second formation portion of the mask, wherein substantially all of the nozzle holes formed along the length of the ablatable material have a substantially uniform structure and have an ink drop trajectory path between the side walls substantially orthogonal the surface plane of the ablatable material, and wherein an operational difference of said nozzle holes between an optimal drop placement location and a sub-optimal drop placement location is substantially reduced due to the laser ablation process relative to nozzle holes formed along a length of the ablatable material in the absence of setting the field lens unit to the second position relative to the projection lens.

14. The ink jet nozzles formed by the process of claim 13 wherein the step of setting the field lens unit to a first position relative to the projection lens further comprises locating a lens focal point at a distance $Z_1$ relative to the projection lens.

15. The ink jet nozzles formed by the process of claim 13 wherein the step of setting the field lens unit to a second position relative to the projection lens further comprises locating a lens focal point at a distance $Z_2$ relative to the projection lens.

16. The ink jet nozzles formed by the process of claim 13 wherein a substantially diverging light beam is transmitted by the projection lens ablating the ablatable material while the field lens unit is in the second position relative to the projection lens.

17. The ink jet nozzles formed by the process of claim 13 wherein an angular offset, θ, between a sub-optimal ink drop trajectory path and an optimal ink drop trajectory path is substantially reduced due to the formation process of the ink jet nozzle holes relative to nozzle holes formed in an ablatable material in the absence of setting the field lens unit to the second position relative to the projection lens.

18. A method for fabricating an ink delivery structure in an ablatable material using a laser beam, the method comprising the steps of:

providing a laser ablation system having a collecting and focusing means for collecting and focusing a laser beam transmitted by a laser, wherein the collecting and focusing means is coupled to an actuator, a projection lens, a mask disposed between the collecting and focusing means and the projection lens, the mask having a first portion and a second portion, and a mask adjustment device for positioning the first or the second portion of the mask relative to the collecting and focusing means, setting the collecting and focusing means with the actuator to a first position relative to the projection lens, positioning the first portion of the mask relative to the first position of the collecting and focusing means, partially ablating the ablatable material with the laser beam through the first portion of the mask, setting the collecting and focusing means to a second position relative to the projection lens, positioning the second portion of the mask relative to the second position of the collecting and focusing means, and ablating the ablatable material with the laser beam through the second portion of the mask.

19. The method of claim 18 further comprising the step of ablating the ablatable material with a substantially diverging laser beam transmitted by the projection lens with the collecting and focusing means in the second position relative to the projection lens, thereby forming nozzle holes having a substantially orthogonal ink delivery path through the ablatable material relative to a plane defined by a length and a width of the ablatable material.

* * * * *